United States Patent
Le et al.

(10) Patent No.: US 10,346,307 B2
(45) Date of Patent: Jul. 9, 2019

(54) POWER EFFICIENT SNOOP FILTER DESIGN FOR MOBILE PLATFORM

(71) Applicant: Samsung Electronics Co., Ltd., Suwon-si, Gyeonggi-do (KR)

(72) Inventors: Hien Le, Cedar Park, TX (US); Apurva Patel, Austin, TX (US)

(73) Assignee: Samsung Electronics Co., Ltd. (KR)

( * ) Notice: Subject to any disclaimer, the term of this patent is extended or adjusted under 35 U.S.C. 154(b) by 261 days.

(21) Appl. No.: 15/353,627

(22) Filed: Nov. 16, 2016

(65) Prior Publication Data

US 2018/0089084 A1    Mar. 29, 2018

Related U.S. Application Data

(60) Provisional application No. 62/401,012, filed on Sep. 28, 2016.

(51) Int. Cl.
| | |
|---|---|
| G06F 12/00 | (2006.01) |
| G06F 12/0831 | (2016.01) |
| G06F 12/0808 | (2016.01) |
| G06F 12/128 | (2016.01) |
| G06F 12/0817 | (2016.01) |
| G06F 12/12 | (2016.01) |

(52) U.S. Cl.
CPC ...... *G06F 12/0831* (2013.01); *G06F 12/0808* (2013.01); *G06F 12/0833* (2013.01); *G06F 12/128* (2013.01); *G06F 12/0826* (2013.01); *G06F 12/12* (2013.01); *G06F 2212/621* (2013.01); *Y02D 10/13* (2018.01)

(58) Field of Classification Search
CPC .................. G06F 12/0826; G06F 12/0831
See application file for complete search history.

(56) References Cited

U.S. PATENT DOCUMENTS

| | | | |
|---|---|---|---|
| 6,272,602 B1 | 8/2001 | Singhal et al. | |
| 6,629,205 B2 | 9/2003 | Cypher | |
| 6,810,467 B1 | 10/2004 | Khare et al. | |
| 6,891,543 B2 | 5/2005 | Wyatt | |
| 7,089,376 B2 * | 8/2006 | Dieffenderfer | G06F 12/0831 711/146 |
| 7,107,410 B2 | 9/2006 | Yang | |

(Continued)

FOREIGN PATENT DOCUMENTS

| | | |
|---|---|---|
| JP | 1998-222423 A | 8/1998 |
| JP | 2008-310414 A | 12/2008 |
| KR | 10-0144093 B1 | 4/1998 |

OTHER PUBLICATIONS

Patel, Avadh et al, "Energy-efficient mesi cache coherence with pro-active snoop filtering for multicore microprocessors," ISLPED '08, Aug. 11-13, 2008, Bangalore, India, pp. 247-252.

(Continued)

*Primary Examiner* — Tammara R Peyton
(74) *Attorney, Agent, or Firm* — Innovation Counsel LLP

(57) ABSTRACT

A method includes: receiving a coherent request from a requester; looking up a state array of a snoop filter table corresponding to an index identified by the coherent request; determining state information corresponding to the coherent request; and determining to access one or more address tag arrays of the snoop filter table based on one or more of the state information, the requester, and a type of the coherent request.

20 Claims, 4 Drawing Sheets

(56) References Cited

U.S. PATENT DOCUMENTS

| | | | |
|---|---|---|---|
| 7,308,538 B2 | 12/2007 | Shen | |
| 7,373,462 B2 | 5/2008 | Blumrich et al. | |
| 7,502,895 B2 | 3/2009 | Jones et al. | |
| 7,581,068 B2 | 8/2009 | Gilbert et al. | |
| 7,603,523 B2 | 10/2009 | Blumrich et al. | |
| 7,603,524 B2 | 10/2009 | Blumrich et al. | |
| 7,617,366 B2 | 11/2009 | Blumrich et al. | |
| 7,937,535 B2 | 5/2011 | Ozer et al. | |
| 7,941,611 B2 | 5/2011 | Goodman et al. | |
| 8,135,917 B2 | 3/2012 | Blumrich et al. | |
| 8,103,836 B2 | 6/2012 | Blumrich et al. | |
| 8,468,308 B2 | 6/2013 | Steely, Jr. et al. | |
| 8,782,348 B2 | 7/2014 | Eddy et al. | |
| 9,058,272 B1 | 6/2015 | O'Bleness et al. | |
| 9,158,689 B2 | 10/2015 | Solihin | |
| 9,244,845 B2 | 1/2016 | Rowlands et al. | |
| 9,268,697 B2 * | 2/2016 | Pardo | G06F 12/0822 |
| 2006/0095684 A1 * | 5/2006 | Shen | G06F 12/0826 |
| | | | 711/146 |
| 2016/0062893 A1 | 3/2016 | Tune et al. | |
| 2016/0092366 A1 | 3/2016 | Pal et al. | |
| 2016/0188471 A1 | 6/2016 | Forrest et al. | |

OTHER PUBLICATIONS

Lotfi-Kamran, Pejman et al. "Turbotag: lookup filtering to reduce coherence directory power," ISLPED '10, Aug. 18-20, 2010, Austin, Texas, USA, pp. 1-6.

* cited by examiner

POWER EFFICIENT SNOOP FILTER DESIGN FOR MOBILE PLATFORM

CROSS-REFERENCE TO RELATED APPLICATION(S)

This application claims the benefits of and priority to U.S. Provisional Patent Application Ser. No. 62/401,012 filed Sep. 28, 2016, the disclosure of which is incorporated herein by reference in its entirety.

TECHNICAL FIELD

The present disclosure relates generally to system-on-chip (SoC) designs, more particularly, to a power-efficient filter design for a mobile platform.

BACKGROUND

In a system-on-chip (SoC) design, hardware coherency is an important factor. In an SoC that includes multiple caching elements, it is necessary to snoop the multiple caching elements in a coherent domain to ensure hardware coherency. Snooping caches can add latency to access and consume additional power. Thus, it is important to keep snooping as efficient as possible when designing an SoC.

One of the common design techniques to minimize snooping is using a snoop filter table (SFT). A snoop filter is a type of logic to track the presence of a block of memory (e.g., a cache line) in caches in a coherent domain. The snoop filter can determine whether snooping of a given cache is required and can filter out unnecessary snooping. The snoop filter can efficiently reduce snooping of caches.

A snoop filter determines a filtering decision, and thus consumes power in the process. Power consumption required for the snoop filter can be a significant component of total dynamic power in a coherent system interconnect design. The snoop filter can further add latency to a coherent request to make the filtering decision for snooping.

A snoop filter tracks the presence of a block of memory in the caches by maintaining a cache of memory blocks referred to as a snoop filter cache that is cached in the coherent domain. The snoop filter cache is commonly organized as an n-way associative cache (i.e., k indexes and n-way per index). Each way requires state information and address tag information. The state information indicates whether the way is tracking any valid cached memory block (valid entry) and if so its location that caches in the system. The address tag information is used to determine an address tag match whether the SFT-tracked memory block is the same as the memory block being requested. The state information and the address tag information are typically stored together in a common array.

Further, a conventional snoop filter design requires a look up of both state and address tag information for all n-way for a given index for every coherent request to determine whether snoop is required. If snooping is required, the snoop filter further determines the caches that need to be snooped. Looking up both the state information and the address tag information for all n-ways for a given index can take time and consume more power. The efficiency of the look up in a snooping process is particularly important when the snoop filter result is a cache miss (i.e., no cache has the requested memory block), or numerous ways of n-way are not valid or contains valid entry but not of the same memory block.

SUMMARY

According to one embodiment, a method includes: receiving a coherent request from a requester; looking up a state array of a snoop filter table corresponding to an index identified by the coherent request; determining state information corresponding to the coherent request; and determining to access one or more address tag arrays of the snoop filter table based on one or more of the state information, the requester, and a type of the coherent request.

According to another embodiment, a snoop filter includes: a snoop filter table comprising a state array and a plurality of address tag arrays; and a logic. The logic is configured to: receive a coherent request from a requester; look up the state array of the snoop filter table corresponding to an index identified by the coherent request; determine a state information corresponding to the coherent request; and determine to access one or more of the plurality of address tag arrays of the snoop filter table based on one or more of the state information, the requester, and a type of the coherent request.

According to yet another embodiment, a snoop filter table includes a state array and a plurality of address tag arrays. The state array stores state information, and the plurality of address tag arrays stores address tag information. The state array is separate from the plurality of address tag arrays.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
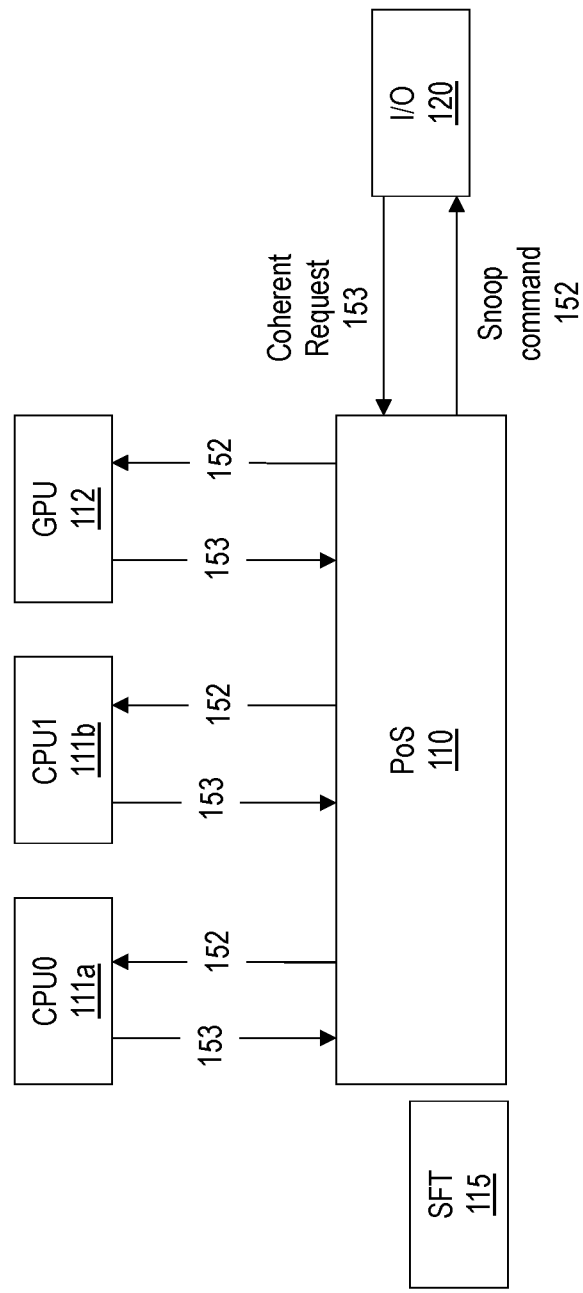
FIG. 1 illustrates an exemplary diagram of a multi-core architecture, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide an efficient snoop filter that is capable of reducing latency and power consumption. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure describes a snoop filter for a mobile platform. The present snoop filter can achieve efficient and accurate tracking of memory blocks particularly in a power-constrained design such as a mobile application processor. In some embodiments, the present snoop filter can be used in a mobile platform where sharing between multiple caching elements is not common and hardware coherency may or may not be required.

The present snoop filter separates state information and address tag information accesses (e.g., read and updated) the state information and the address tag information independently. According to one embodiment, in response to a coherent request, the present snoop filter can check the state information prior to checking the address tag information. Based on the state information, a request source, and a type of a request, the snoop filter can determine whether a look up for the tag information is further required. If a look up for the tag information is required, the snoop filter performs the tag information look up efficiently. Similarly, the snoop filter performs can efficiently perform an update for the state information and the address tag information as will be discussed in further details below.

FIG. 1 illustrates an exemplary diagram of a multi-core architecture, according to one embodiment. The multi-core architecture can include a plurality of central processing unit (CPU) cores, 111a and 111b, a graphical processing unit (GPU) 112, a point of serialization (PoS) 110, and one or more input/output (I/O) devices 120. These masters such as the CPU cores 111a and 111b, the GPU 112, and the one or more I/O devices 120 may have multiple levels of internal caches such as L1, L2, and L3 caches. As these masters cache coherent and shared memory blocks (cache lines) in their internal caches, the snoop filter must keep track of a record and location of these memory blocks. Any master can issue coherent or non-coherent requests. Although the present example shows two CPU cores and one GPU, it is understood that any number of CPU cores and CPUs can be used without deviating from the scope of the present disclosure. The PoS 110 ensures the serialization of the memory access requests using snoop filter logic to provide memory coherency. For example, the PoS 110 receives a coherent request 153 from an I/O device 120. Examples of the I/O device include, but are not limited to, Industry Standard Architecture (ISA) devices, Peripheral Component Interconnect (PCI) devices, PCI-X devices, PCI Express devices, Universal Serial Bus (USB) devices, Advanced Technology Attachment (ATA) devices, Small Computer System Interface (SCSI) devices, and InfiniBand devices.

In response to the coherent request 153, the PoS 110 issues a snoop command 152 to the CPU cores 111a and 111b and the GPU 112. The CPU cores 111a and 111b and the GPU 112 provide the requested coherent information back to the PoS 110. When sending the snoop command 152, the PoS 110 refers to a snoop filter table 115. According to one embodiment, the snoop filer table 115 stores data such as, for example, an identifier of the I/O device 120 that originates the coherent request 153, the memory address being snooped, cache nodes that are snooped, and the current snoop state (e.g., pending, invalid, shared, exclusive, and modified) for the snoop request.

Figure 2:
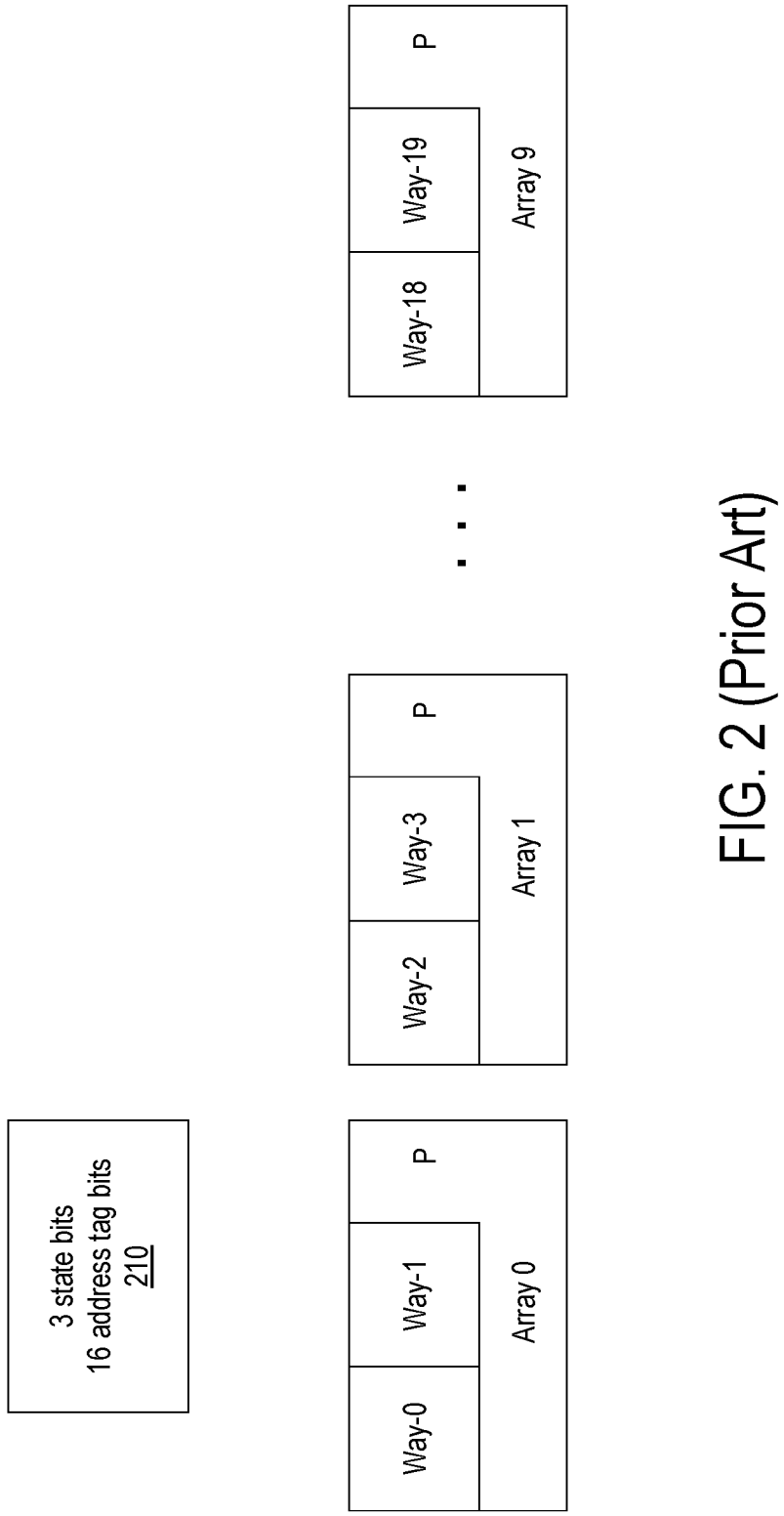
FIG. 2 illustrates an exemplary diagram of a conventional snoop filter.

FIG. 2 illustrates an exemplary diagram of a conventional snoop filter. The snoop filter includes a data structure to track the location of memory blocks that are currently cached in by cache-capable agents (or masters) such as CPUs and GPUs. As an example, for a system that has 3 cache-capable agents, CPU0, CPU1, and a GPU, the snoop filter can use 1 bit state bit per agent to track the presence of the memory blocks in each agent's cache. In addition, the snoop filter must store enough address bits to identify the cache line addresses. In this exemplary diagram, the snoop filter uses 3 state bits and 16 address tag bits to look up the stated and address tag information stored in arrays of a snoop filter table. Each of the arrays of the snoop filter table stores both state and address information. For example, the size of each array is 2K rows by 39 bits. In the present example, the snoop filter table includes 10 arrays (Array 0-Array 9), and each array includes two ways (Way-n and Way-(n+1), n=0, 2, 4, . . . ). Each logical way has 3 state bits and 16 address bits. Each physical array entry has two logical ways (38 bits) and one parity bit P.

Figure 3:
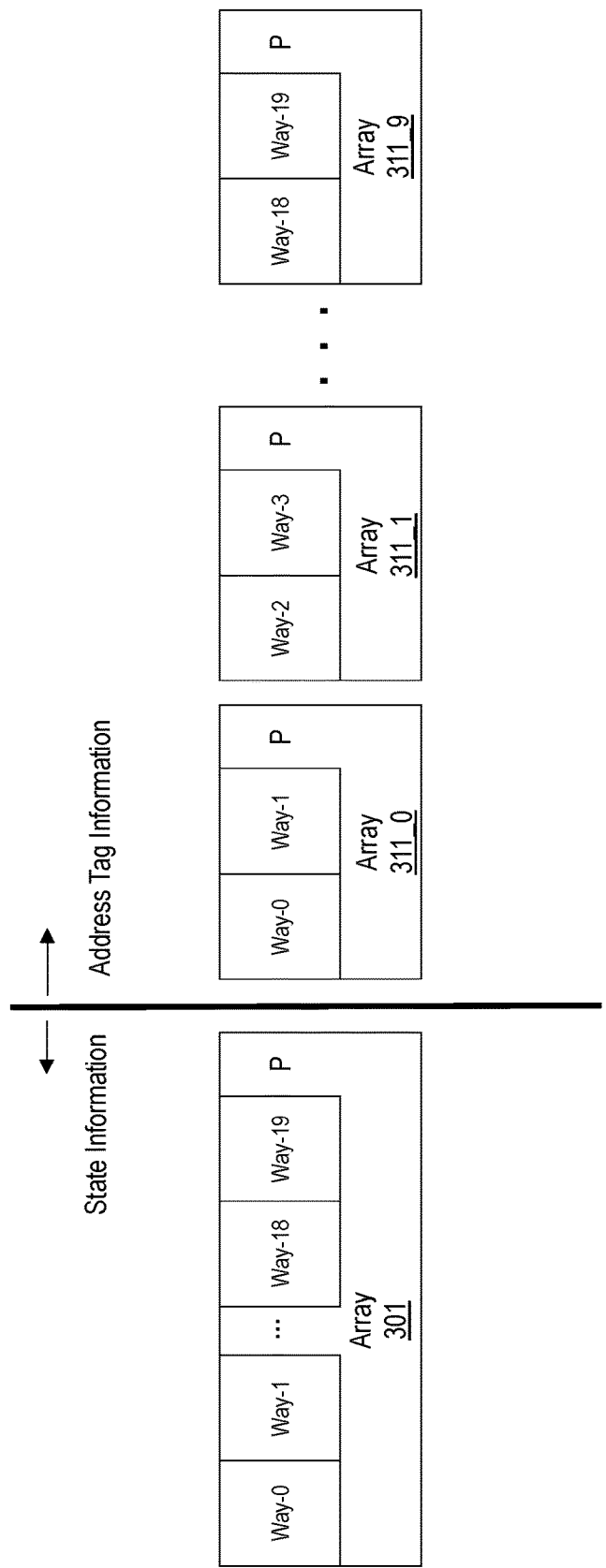
FIG. 3 illustrates an exemplary diagram for the present snoop filter, according to one embodiment.

FIG. 3 illustrates an exemplary diagram for the present snoop filter, according to one embodiment. The present snoop filter separates the state information and the address tag information and stores the state information in separate arrays. Therefore, the present snoop filter can access the state information and address tag information independently. In the present example, the snoop filter table includes a state array 301 and 10 address tag arrays 311_0-311_9. The state array 301 stores 20 ways (Way-0 to Way-19), each for storing state information. For example, the size of the state array 301 is 2K row by 61 bits. The 61 bits include 60 state bits (3 state bits per ways by 20 ways) and 1 parity bit P. Each of the address tag arrays 311 stores two ways (Way-n and Way-(n+1), n=0, 2, 4, . . . ). Both of the two ways of an address tag array 311 store the address tag information. For example, the size of each address tag array 311 is 2K rows by 33 bits; 33 bits includes 32 address bits (16 address per ways by 2 ways) and 1 parity bit P.

The present snoop filter can first check the state information in the snoop filter table in accordance with a coherent request received from various cache-capable agents including, a CPU core, a CPU, and an I/O device. Based on one or more of the state information, a request source (i.e., the I/O device), and a type of the coherent request, the snoop filter determines whether a look up of the tag information is further required.

Figure 4:
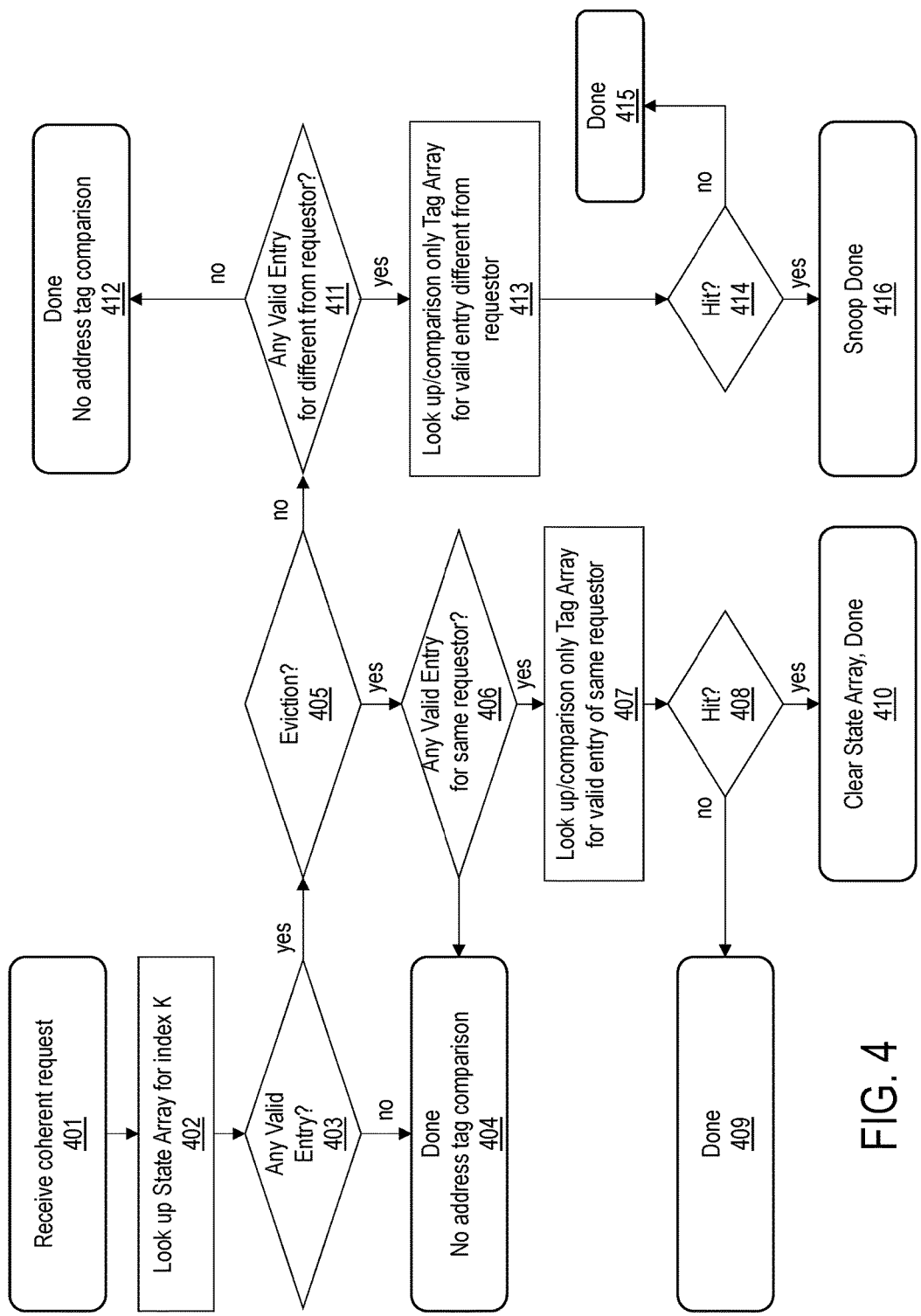
FIG. 4 illustrates an exemplary flowchart of the present system and method, according to one embodiment.

FIG. 4 illustrates an exemplary flowchart of the present system and method, according to one embodiment. A snoop filter receives a coherent request from a requester (401). The requester can be any cache-capable agents such as a CPU core, a GPU, and an I/O device. The requester may also be referred to as an agent or a master. It is noted that non-coherent requests from any cache-capable agents do not activate the snoop filter. The requester can be an I/O device including, but not limited to, an ISA device, a PCI device, a PCI-X device, a PCI Express device, a USB device, an ATA device, a SCSI device, and an InfiniBand device.

The snoop filter looks up the state array of a snoop filer table (SFT) for an index identified by the coherent request (402). If there is no valid entry in the snoop filter table (403), the snoop filter determines that no address tag comparison is necessary and completes the coherent request (404). If there is a valid entry in the snoop filter table (403), the snoop filter determines if the coherent request is an eviction request (405). If the coherent request is an eviction request, the snoop filter checks if there is a valid entry from the same requester (406). If the eviction request is from the same requester, the snoop filter looks up (or compare) only the address tag array for the valid entry of the same requester (407). If the look up of the address tag is a cache hit (408), the snoop filter clears the state information for eviction for the correspondent entry (410). If the look up is a cache miss (408), the snoop filter completes the eviction request (409).

If the coherent request is not an eviction request (405), the snoop filter further checks if there is a valid entry from a different requester (411); which mean other agents in the system may have cached the requested cache line. If the coherent request is originated from the different requester, the snoop filter looks up (and/or compares) only the address tag array for a valid entry that is tagged by different requesters (413). If the look up is a cache hit (414), it means the requested cache line is cached in one or more other agents in the system; the snoop filter indicates that a snoop operation must be sent to these agents to complete the coherent request (416). If the look up is a cache miss (414), it means the requested line is not cached in any of agents in the system; thus, the snoop filter indicate that no snoop operation is required to complete the coherent request (415).

The present snoop filter separates state information and address tag information to avoid or minimize the need of address tag look up or comparison based on one of more of state information, a type of a coherent request, and a source of the coherent request. An address tag look up is performed only when necessary based on the determination of the snoop filter state information and the type of a request. Therefore, the present snoop filer can save the power and shorten the latency to formulate a snoop filter decision.

According to one embodiment, a method includes: receiving a coherent request from a requester; looking up a state array of a snoop filter table corresponding to an index identified by the coherent request; determining state information corresponding to the coherent request; and determining to access one or more address tag arrays of the snoop filter table based on one or more of the state information, the requester, and a type of the coherent request.

The requester may be one of a CPU, a GPU, and an I/O device.

The I/O device may be one of an ISA device, a PCI device, a PCI-X device, a PCI Express device, a USB device, an ATA device, a SCSI device, and an InfiniBand device.

The method may further include: checking whether a valid entry corresponding to the coherent request exists in the snoop filter table; and determining not to access the one or more address tag arrays if there is no valid entry.

The method may further include: checking whether a valid entry corresponding to the coherent request exists in the snoop filter table; and determining to access the one or more address tag arrays corresponding to the valid entry.

The method may further include: determining that the coherent request is an eviction request; checking if there is a valid entry in the snoop filter table from the requester; and looking up only an address tag array for the valid entry of the requester.

The method may further include: checking if the address tag array exits in the one or more address tag arrays; and clearing the state array corresponding to the eviction request.

The method may further include: determining that the coherent request is not an eviction request; checking if there is a valid entry in the snoop filter table from a different requester; and looking up the one or more address tag arrays except an address tag array corresponding to the requester.

According to another embodiment, a snoop filter includes: a snoop filter table comprising a state array and a plurality of address tag arrays; and a logic. The logic is configured to: receive a coherent request from a requester; look up the state array of the snoop filter table corresponding to an index identified by the coherent request; determine a state information corresponding to the coherent request; and determine to access one or more of the plurality of address tag arrays of the snoop filter table based on one or more of the state information, the requester, and a type of the coherent request.

The requester may be one of a CPU, a GPU, and an I/O device.

The I/O device may be one of an ISA device, a PCI device, a PCI-X device, a PCI Express device, a USB device, an ATA device, a SCSI device, and an InfiniBand device.

The logic may be further configured to: check whether a valid entry corresponding to the coherent request exists in the snoop filter table; and determine not to access the one or more address tag arrays if there is no valid entry.

The logic may be further configured to: check whether a valid entry corresponding to the coherent request exists in the snoop filter table; and determine to access the one or more address tag arrays corresponding to the valid entry.

The logic may be further configured to: determine that the coherent request is an eviction request; check if there is a valid entry in the snoop filter table from the requester; and look up only an address tag array for the valid entry of the requester.

The logic may be further configured to: check if the address tag array exits in the one or more address tag arrays; and clear the state array corresponding to the eviction request.

The logic may be further configured to: determine that the coherent request is not an eviction request; check if there is a valid entry in the snoop filter table from a different requester; and look up the one or more address tag arrays except an address tag array corresponding to the requester.

According to yet another embodiment, a snoop filter table includes a state array and a plurality of address tag arrays. The state array stores state information, and the plurality of address tag arrays stores address tag information. The state array is separate from the plurality of address tag arrays.

The above example embodiments have been described hereinabove to illustrate various embodiments of implementing a system and method for providing an efficient snoop filter that is capable of reducing latency and power consumption. Various modifications and departures from the disclosed example embodiments will occur to those having ordinary skill in the art. The subject matter that is intended to be within the scope of the invention is set forth in the following claims.

What is claimed is:

1. A method comprising:
   receiving a coherent request from a requester;
   looking up a state array of a snoop filter table corresponding to an index identified by the coherent request;
   determining state information corresponding to the coherent request; and
   determining to access one or more address tag arrays of the snoop filter table based on one or more of the state information, the requester, and a type of the coherent request,
   wherein the state information identifies a state for the coherent request, and
   wherein the state array storing the state information is stored separately from the one or more address tag arrays in the snoop filter table.

2. The method of claim 1, wherein the requester is one of a CPU, a GPU, and an I/O device.

3. The method of claim 2, wherein the I/O device is one of an ISA device, a PCI device, a PCI-X device, a PCI Express device, a USB device, an ATA device, a SCSI device, and an InfiniBand device.

4. The method of claim 1, further comprising:
   checking whether a valid entry corresponding to the coherent request exists in the snoop filter table; and
   determining not to access the one or more address tag arrays if there is no valid entry.

5. The method of claim 1, further comprising:
   checking whether a valid entry corresponding to the coherent request exists in the snoop filter table; and
   determining to access the one or more address tag arrays corresponding to the valid entry.

6. The method of claim 5, further comprising:
   determining that the coherent request is an eviction request;
   checking if there is a valid entry in the snoop filter table from the requester; and
   looking up only an address tag array for the valid entry of the requester.

7. The method of claim 6, further comprising:
   checking if the address tag array exits in the one or more address tag arrays; and clearing the state array corresponding to the eviction request.

8. The method of claim 5, further comprising:
   determining that the coherent request is not an eviction request;
   checking if there is a valid entry in the snoop filter table from a different requester; and
   looking up the one or more address tag arrays except an address tag array corresponding to the requester.

9. A snoop filter comprising:
   a snoop filter table comprising a state array and a plurality of address tag arrays; and
   a logic configured to:
   receive a coherent request from a requester;
   look up the state array of the snoop filter table corresponding to an index identified by the coherent request;
   determine a state information corresponding to the coherent request; and
   determine to access one or more of the plurality of address tag arrays of the snoop filter table based on one or more of the state information, the requester, and a type of the coherent request,
   wherein the state information identifies a state for the coherent request, and
   wherein the state array storing the state information is stored separately from the one or more address tag arrays in the snoop filter table.

10. The snoop filter of claim 9, wherein the requester is one of a CPU, a GPU, and an I/O device.

11. The snoop filter of claim 10, wherein the I/O device is one of an ISA device, a PCI device, a PCI-X device, a PCI Express device, a USB device, an ATA device, a SCSI device, and an InfiniBand device.

12. The snoop filter of claim 9, wherein the logic is further configured to:
   check whether a valid entry corresponding to the coherent request exists in the snoop filter table; and
   determine not to access the one or more address tag arrays if there is no valid entry.

13. The snoop filter of claim 9, wherein the logic is further configured to:
   check whether a valid entry corresponding to the coherent request exists in the snoop filter table; and
   determine to access the one or more address tag arrays corresponding to the valid entry.

14. The snoop filter of claim 13, wherein the logic is further configured to:
   determine that the coherent request is an eviction request;
   check if there is a valid entry in the snoop filter table from the requester; and
   look up only an address tag array for the valid entry of the requester.

15. The snoop filter of claim 14, wherein the logic is further configured to:
   check if the address tag array exits in the one or more address tag arrays; and
   clear the state array corresponding to the eviction request.

16. The snoop filter of claim 13, wherein the logic is further configured to:
   determine that the coherent request is not an eviction request;
   check if there is a valid entry in the snoop filter table from a different requester; and
   look up the one or more address tag arrays except an address tag array corresponding to the requester.

17. A snoop filter table comprising a state array and a plurality of address tag arrays,
   wherein the state array stores state information that identifies a state for a coherent request received from a requester,
   wherein the plurality of address tag arrays stores address tag information, and
   wherein the state array is separate from the plurality of address tag arrays.

18. The snoop filter table of claim 17, wherein the state information includes a pending state, an invalid state, a shared state, an exclusive state, and a modified state.

19. The method of claim 1, wherein the state information includes a pending state, an invalid state, a shared state, an exclusive state, and a modified state.

20. The snoop filter of claim 9, wherein the state information includes a pending state, an invalid state, a shared state, an exclusive state, and a modified state.

* * * * *